US005697999A

United States Patent [19]
Reunamaki

[11] Patent Number: 5,697,999
[45] Date of Patent: *Dec. 16, 1997

[54] GLASS SHEET BENDING APPARATUS

[75] Inventor: Pauli T. Reunamaki, Perrysburg, Ohio

[73] Assignee: Glasstech, Inc., Perrysburg, Ohio

[*] Notice: The term of this patent shall not extend beyond the expiration date of Pat. No. 5,498,275.

[21] Appl. No.: 670,504

[22] Filed: Jun. 27, 1996

Related U.S. Application Data

[62] Division of Ser. No. 551,909, Oct. 23, 1995, Pat. No. 5,556,444, which is a division of Ser. No. 138,739, Oct. 18, 1993, Pat. No. 5,498,275.

[51] Int. Cl.⁶ ............................................. C03B 23/027
[52] U.S. Cl. ..................... 65/106; 65/102; 65/104; 65/268; 65/273; 65/286; 65/287
[58] Field of Search ....................... 65/102, 104, 106, 65/268, 273, 286, 287

[56] References Cited

U.S. PATENT DOCUMENTS

| 4,199,342 | 4/1980 | Mestre et al. ............ 65/106 |
| 4,282,026 | 8/1981 | McMaster et al. . |
| 4,302,417 | 11/1981 | Michelotti ................ 65/106 |
| 4,361,433 | 11/1982 | Smith, Jr. et al. .......... 65/106 |
| 4,586,946 | 5/1986 | Kramer et al. . |
| 4,661,141 | 4/1987 | Nitschke et al. . |
| 4,822,398 | 4/1989 | McMaster et al. . |
| 4,872,898 | 10/1989 | Enk et al. . |
| 4,881,962 | 11/1989 | Reunamaki et al. . |
| 4,883,527 | 11/1989 | McMaster et al. . |
| 4,909,824 | 3/1990 | McMaster et al. . |
| 5,004,492 | 4/1991 | Borer et al. . |
| 5,336,288 | 8/1994 | Carlomagno et al. ......... 65/273 |
| 5,498,275 | 3/1996 | Reunamaki ................ 65/106 |

FOREIGN PATENT DOCUMENTS

| 157111 | 5/1991 | Taiwan . |
| 164256 | 7/1991 | Taiwan . |
| 167515 | 9/1991 | Taiwan . |

Primary Examiner—Donald E. Czaja
Assistant Examiner—Michael P. Colaianni
Attorney, Agent, or Firm—Brooks & Kushman P.C.

[57] ABSTRACT

Glass sheet bending apparatus (20) including at least one deformable mold (22) has a linkage (26) that extends between mold members (24) and includes connector links (28) fixed to the mold members and having pivotal connections (32) to each other about axes that extend parallel to the glass sheet throughout the bending, and the linkage also has control links (34) that have pivotal connections (36) about axes that extend perpendicular to the glass sheet throughout the bending as well as having universal connections (38) to each other such that the linkage moves the mold members for bending with a constant radius of curvature. The bending apparatus (20) preferably has a pair of the deformable molds (22,44) that are arranged in lower and upper locations and have respective linkages (26,48) as well as having the mold members (24,46) thereof provided with quench openings (66) through which quenching gas is supplied to quench the bent glass sheet for heat strengthening or tempering. An actuating mechanism (154) of the apparatus is constructed so as to move the linkages (26,48) to perform the bending which may be performed by moving the deformable molds (22,44) toward each other during the bending.

10 Claims, 11 Drawing Sheets

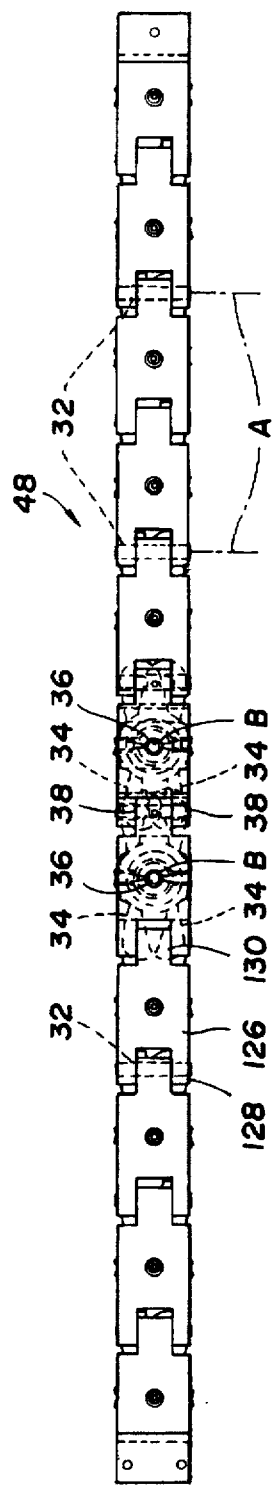
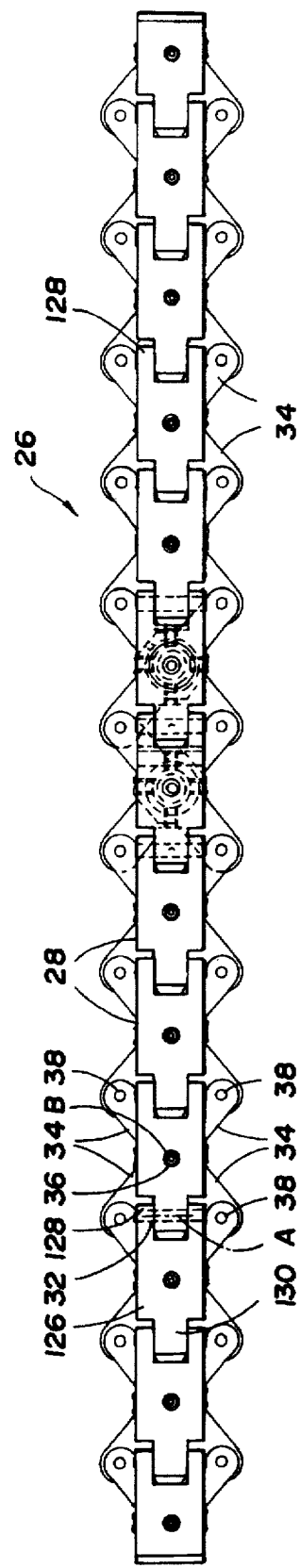
Fig. 9
Fig. 10

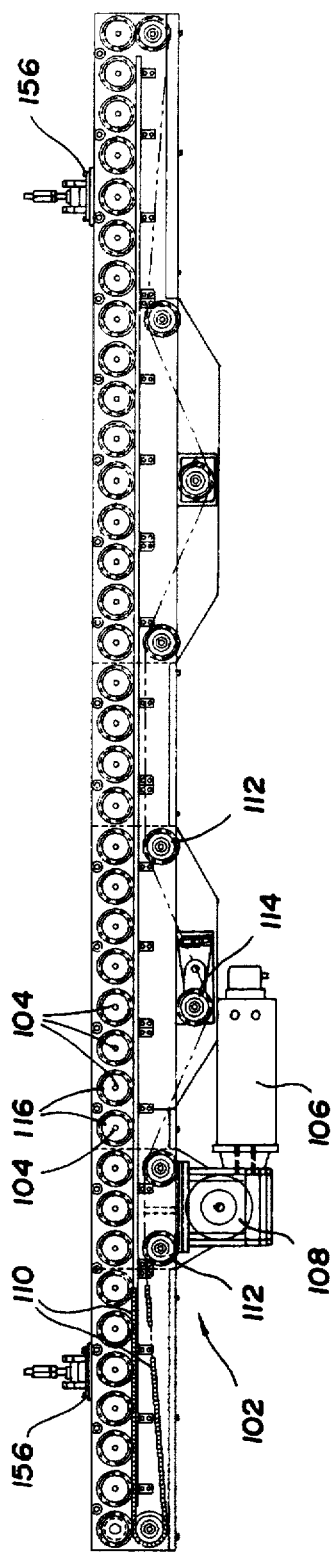
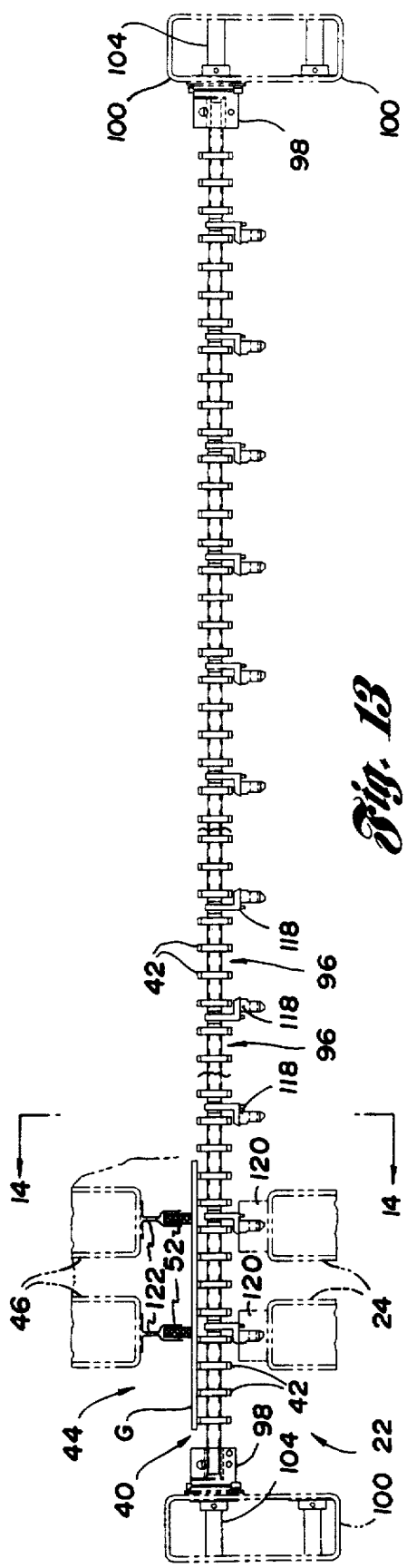

GLASS SHEET BENDING APPARATUS

This is a divisional of application Ser. No. 08/551,909, now U.S. Pat. No. 5,556,444, filed on Oct. 23, 1995 of Pauli T. Reunamaki entitled "Glass Sheet Bending Apparatus And Method" which is a divisional of Ser. No. 08/138,739 filed Oct. 18, 1993 of Pauli T. Reunamaki, entitled "Glass Sheet Bending Apparatus", now U.S. Pat. No. 5,498,275.

TECHNICAL FIELD

This invention relates to apparatus for bending glass sheets to a constant radius of curvature and also relates to a method for bending glass sheets.

BACKGROUND ART

As disclosed by U.S. Pat. No. 4,822,398 McMaster et al, glass sheets have previously been bent between a pair of opposed bending platens whose movement between flat and bent shapes during cyclical operation is provided by a plurality of actuators connected to the platens. The platens are arranged in lower and upper positions with both platens provided with wheels that engage the glass sheet during the bending while the glass sheet is continually conveyed back and forth in order to reduce marking and distortion. After the bending, quench tubes that are part of the platens supply quenching gas that provides tempering or heat strengthening of the bent glass sheet.

U.S. Pat. No. 4,881,962 Reunamaki et al discloses bending and tempering of glass sheets wherein a roller conveyor is moved from a flat shape to a curved shape having an axis of curvature transverse to the direction of conveyance to provide bending of a glass sheet being conveyed thereby under the actuation of cylinders. A linkage that connects the cylinders has all of its links pivotable about the axes transverse to the direction of the conveyance. As such, the bending is controlled by the extent to which the cylinders are extended and retracted during each cycle of operation.

DISCLOSURE OF INVENTION

An object of the present invention is to provide improved glass sheet bending apparatus for bending a glass sheet to a constant radius of curvature. In carrying out this object, the glass sheet bending apparatus of the invention has particular utility for also quenching the glass sheet after it is bent to the constant radius of curvature.

The glass sheet bending apparatus of the invention includes a deformable mold for engaging a heated glass sheet to be bent. This deformable mold includes a plurality of mold members that are movable with respect to each other to bend the glass sheet. A linkage of the apparatus extends between the mold members to control movement thereof with respect to each other. The linkage includes connector links that are fixedly connected to the mold members and that have pivotal connections to each other about axes that extend parallel to the glass sheet throughout the bending of the glass sheet. The linkage also includes control links that have respective pivotal connections to the connector links about axes that extend perpendicular to the glass sheet throughout the bending of the glass sheet. These control links have universal connections to each other such that the linkage moves the mold members of the deformable mold to bend the glass sheet with a constant radius of curvature.

In its preferred construction, the glass sheet bending apparatus is a horizontal conveyor having rotatable conveying elements supported by the mold members to support and convey the glass sheet for horizontal movement during the bending.

In its preferred construction, the glass sheet bending apparatus also includes another deformable mold that cooperates with the first deformable mold in an opposed relationship and has a plurality of mold members that engage the glass sheet and are movable with respect to each other to bend the glass sheet. This second deformable mold includes a linkage that extends between the mold members thereof to control movement thereof with respect to each other and has connector links fixedly connected to the mold members and having pivotal connections to each other about axes that extend parallel to the glass sheet during the bending. The second linkage has control links having pivotal connections to the connector links about axes that extend perpendicular to the glass sheet during the bending. The control links of the second mentioned linkage have universal connections to each other such that the second deformable mold provides bending to the constant radius curved shape in cooperation with the first mentioned deformable mold.

As disclosed, the deformable molds of the glass sheet bending apparatus are embodied by a lower deformable mold and an upper deformable mold that oppose each other. The lower deformable mold is embodied by a horizontal conveyor having rotatable conveying elements supported by the mold members thereof to support and convey the glass sheet for horizontal movement during the bending. The upper deformable mold is located above the lower deformable mold that conveys the glass sheet in an opposed relationship. The upper deformable mold includes a plurality of mold members having rotatable elements that engage the glass sheet and are movable with respect to each other to cooperate with the lower deformable mold to bend the glass sheet. The upper deformable mold like the lower deformable molds includes an associated linkage that extends between the mold members thereof to control movement thereof with respect to each other and has connector links that are fixedly connected to the mold members thereof and have pivotal connections to each other about axes that extend parallel to the glass sheet during the bending. The linkage of the upper deformable mold like the linkage of the lower deformable mold includes control links having pivotal connections to the connector links about axes that extend perpendicular to the glass sheet during the bending. The control links of the linkage of the upper deformable mold like the linkage of the lower deformable mold have universal connections to each other such that the upper deformable mold provides bending to the constant radius curve shape in cooperation with the lower deformable mold.

In the preferred construction of the glass sheet bending apparatus, each connector link has a pair of the control links pivotally mounted thereon in an X shape. This X shape of the pairs of the control links reduces the loading applied to the pivotal connections between the connector links. Furthermore, the universal connections of the control links to each other are preferably embodied by spherical bearings. Thus, each connector link has a pair of the control links pivotally mounted thereon in an X shape with the control links connected to each other by these spherical bearings in a manner that strengthens the linkage construction.

In the preferred construction disclosed, the glass sheet bending apparatus has the mold members of the lower and upper deformable molds each provided with an elongated shape with opposite ends. The linkages of the lower and upper molds have connections to the respective mold members at adjacent ends of the mold members. Each of the lower and upper deformable molds also has another linkage of the same construction as the first linkage thereof and having connections to the respective mold members at the opposite adjacent ends thereof as the first linkages. Each elongated mold member is disclosed as being embodied by a quench tube having quench openings through which quenching gas is supplied to quench the glass sheet after the bending in order to provide heat strengthening or tempering. Each quench tube preferably includes quench plenums mounted thereon with rotatable elements of the respective deformable mold mounted between the quench plenums. These quench plenums define the quench openings through which the quenching gas is supplied to quench the bent glass sheet. Preferably, the quench plenums have opposite ends that interfit with the quench plenums mounted on the adjacent quench tubes of the respective deformable mold and have quench openings positioned and oriented to provide a uniform distribution of the quenching gas that quenches the glass sheet.

An actuating mechanism of the glass sheet bending apparatus moves the linkages of the lower and upper molds to perform the bending. This actuating mechanism has connections to the linkages to provide movement thereof which as disclosed is to upwardly concave shapes to move the mold members of the lower and upper deformable molds and bend the glass sheet therebetween to an upwardly concave shape. The linkage of the lower deformable mold has a fixed center connection and also has movable end connections to the actuating mechanism, while the linkage of the upper deformable mold has a center support having a connection thereto and to the actuating mechanism and also has movable end connections to the actuating mechanism. Flexible members of the actuating mechanism are connected to the movable end connections of the linkages of the lower and upper deformable molds. The actuating mechanism has wheels that receive the flexible members and also has an actuator that rotates the wheels to move the flexible members and linkages connected thereto in order to move the lower and upper deformable molds to perform the bending.

The actuating mechanism of the glass sheet bending apparatus has a construction that permits adjustment of the spacing between the lower and upper deformable molds as well as actuating the bending between the flat and bent shapes. This construction of the actuating mechanism includes first and second rotary actuator members one of which is driven by the rotary actuator. A second rotary actuator connects the first and second rotary actuator members and is operable to selectively prevent or provide relative rotation between these rotary actuator members. The wheels that receive the flexible members connected to the movable end connections of the linkage of the lower deformable mold are fixed on one of the rotary actuator members, while the wheels that receive the flexible members connected to the movable end connections of the linkage of the upper deformable member are fixed to the other rotary actuator member. The center support for the linkage of the upper deformable mold has a wheel assembly including a connection thereto and having a pair of flexible members wrapped in opposite directions about the wheel assembly. This center support for the linkage of the upper deformable mold also has a pair of wheels respectively mounted by the first and second rotary actuator members and respectively receiving the flexible members of the wheel assembly in oppositely wrapped directions. Operation of the first rotary actuator moves the end connections of both linkages to perform the bending of the glass sheet between the lower and upper deformable molds, while operation of the second rotary actuator moves both end connections and the center support connected to the linkage of the upper deformable mold to provide movement that changes the spacing between the lower and upper deformable molds. Operation of both actuators simultaneously performs the bending while also changing the spacing between the opposed deformable molds.

Another object of the present invention is to provide an improved method for bending a heated glass sheet.

In carrying out the above method, a heated glass sheet is bent by locating the heated glass sheet between a pair of opposed deformable molds that are initially spaced from each other a greater thickness than the thickness of the glass sheet. The deformable molds are simultaneously bent and moved toward each other such that both molds engage the glass sheet to provide the bending of the glass sheet.

In performing the method for bending the heated glass sheet, it is also possible for the deformable molds after the bending to provide quenching gas that quenches the bent glass sheet.

In the preferred practice of the method for bending the heated glass sheet, the heated glass sheet is initially supported and conveyed by one of the deformable molds which is located below the other deformable mold in a lower and upper arrangement, and the deformable molds are bent to upwardly concave bent shapes as the molds are simultaneously moved toward each other. Furthermore, the upper deformable mold is preferably moved downwardly to provide the movement of the molds toward each other.

The objects, features and advantages of the present invention are readily apparent from the following detailed description of the best mode for carrying out the invention when taken in connection with the accompanying drawings.

BRIEF DESCRIPTION OF DRAWINGS

FIG. 9 is a top plan view of the upper linkage taken along the direction of line 9—9 in FIG. 6;

FIG. 10 is a bottom plan view of the lower linkage taken along the direction of line 10—10 in FIG. 6;

FIG. 12 is a side elevational view taken along the direction of line 12—12 in FIG. 2 to illustrate a drive mechanism that drives rotatable conveying elements of the lower deformable mold;

FIG. 13 is a longitudinal view taken along the direction of line 13—13 in FIG. 1 to illustrate the manner in which the glass sheet is positioned between the lower and upper deformable molds;

BEST MODE FOR CARRYING OUT THE INVENTION

With reference to FIGS. 1–5 of the drawings, glass sheet bending apparatus constructed in accordance with the present invention is generally indicated by 20 and is operable to perform the method of the invention upon receiving a heated glass sheet to be bent from an unshown furnace which may be of any conventional construction. The apparatus 20 ultimately delivers the bent glass sheet to an unshown delivery apparatus which may be of any suitable construction. As shown by the drawings and hereinafter described, the bending by apparatus 20 starts with a heated flat glass sheet and is performed to provide a bent shape of a constant radius. However, it should be appreciated that the bending can also be performed starting with a slightly prebent glass sheet such as can be provided by prior conveyance on curved rolls of a roller conveyor. Thus, in such cases, the bending will be performed starting with curved mold shapes that are further bent rather than starting with the flat mold shapes that are specifically illustrated.

Figure 1:
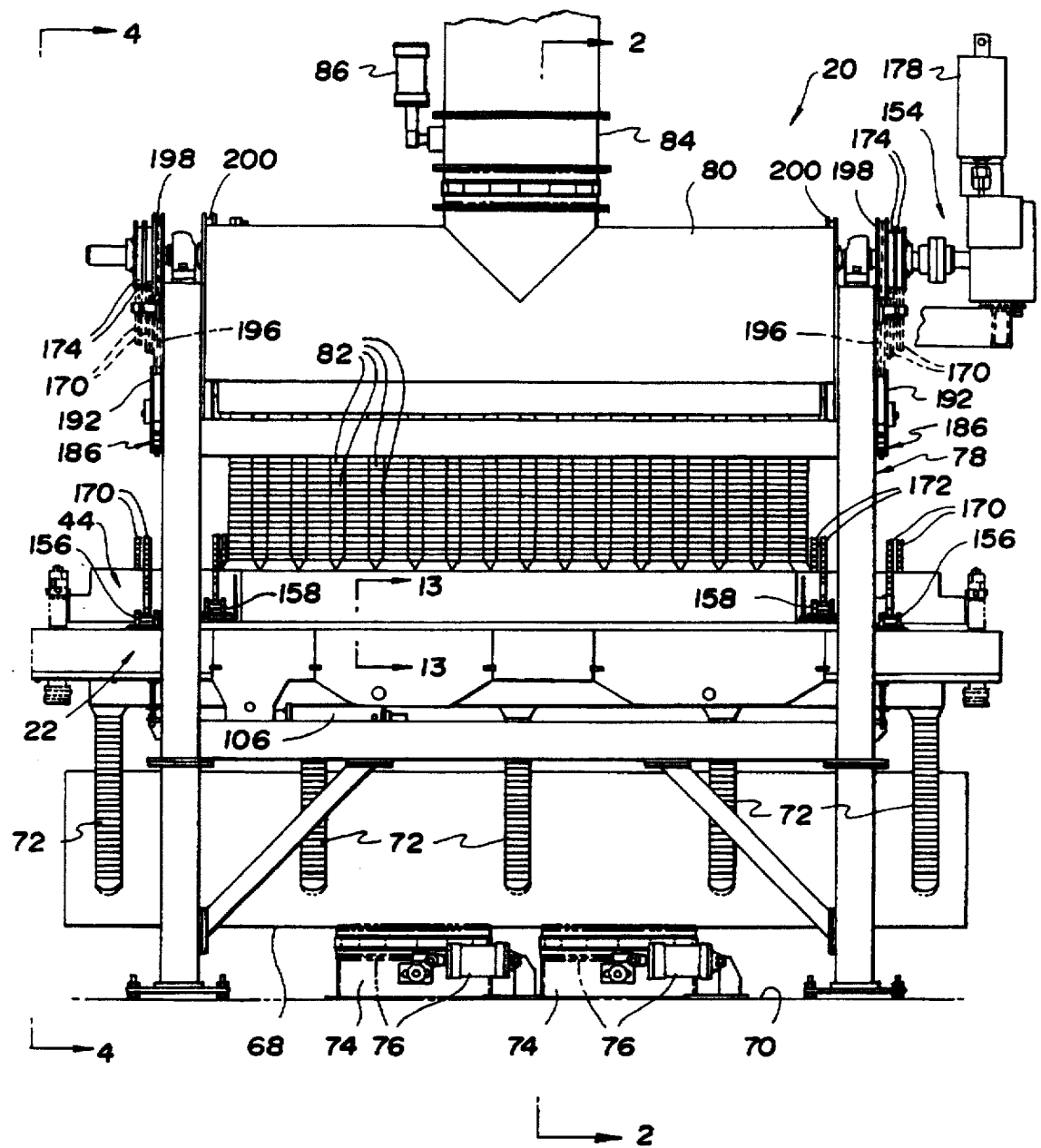
FIG. 1 is a side elevational view of glass sheet bending apparatus constructed in accordance with the present invention.
Figure 2:
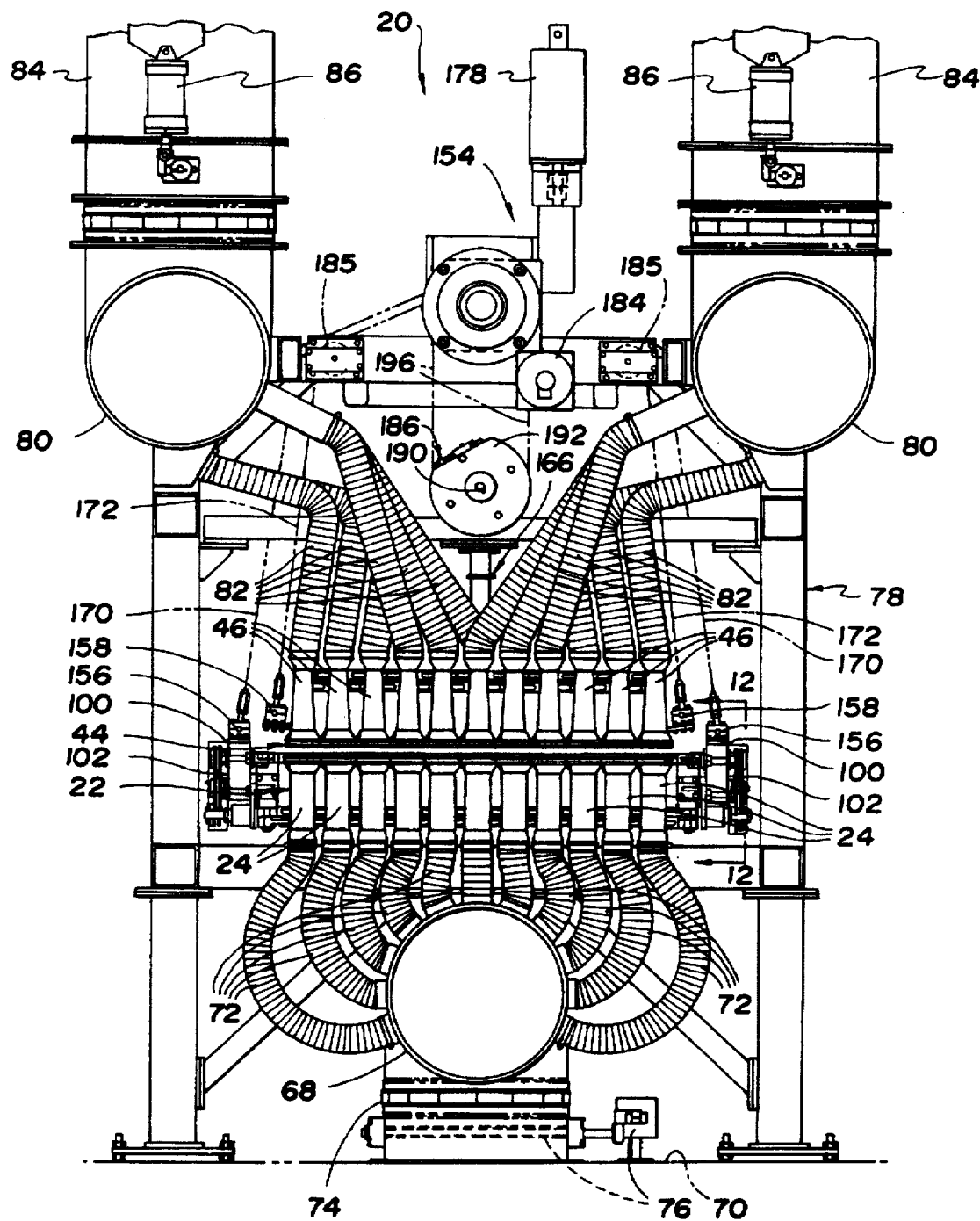
FIG. 2 is an end elevational view taken through the apparatus along line 2—2 in FIG. 1 and is illustrated with the deformable molds of the apparatus in a flat shape prior to the bending cycle.
Figure 6:
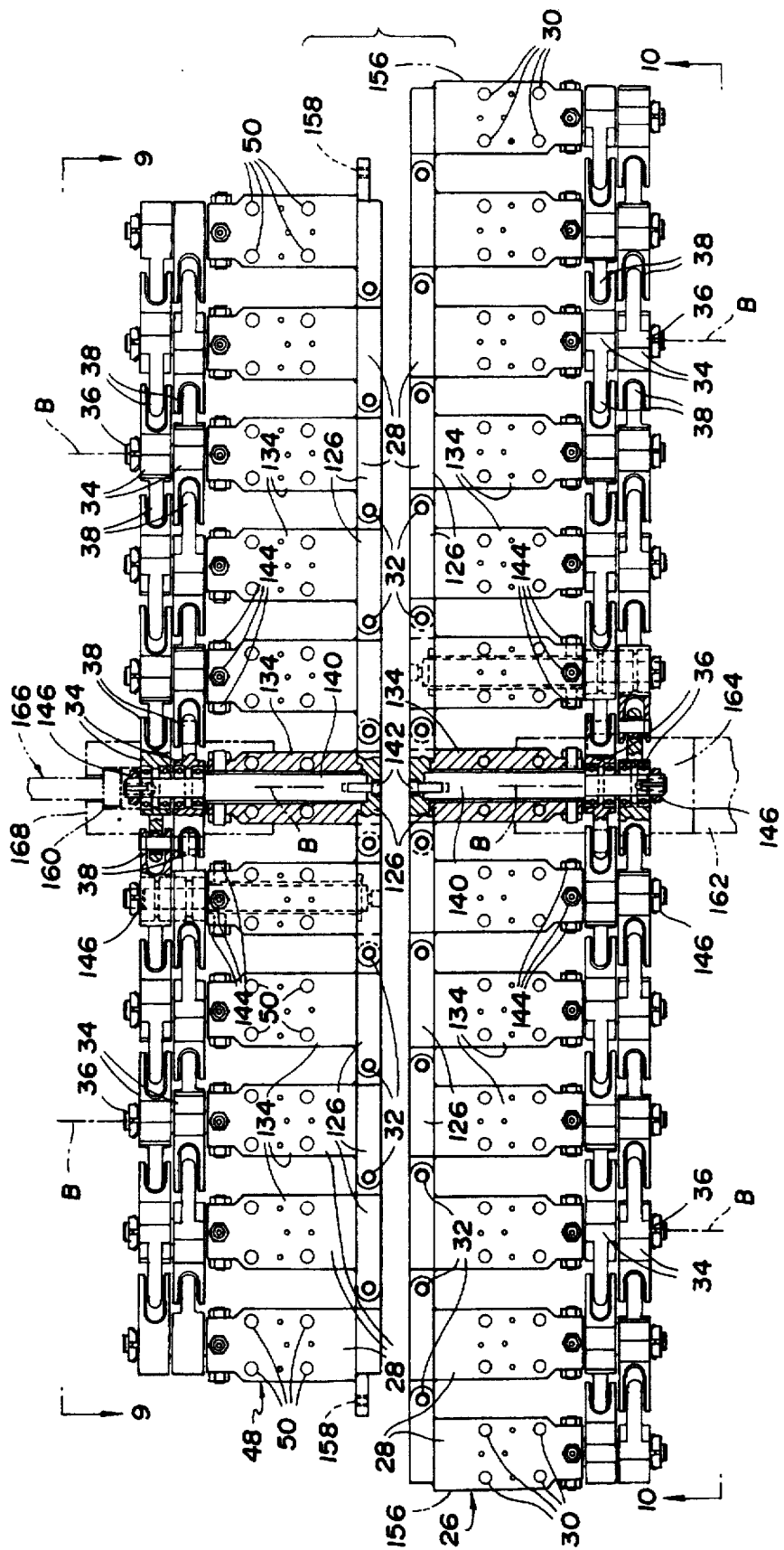
FIG. 6 is an enlarged view taken in the same direction as FIG. 4 and illustrates the constructions of the linkages that control the movement of the deformable molds.
Figure 7:
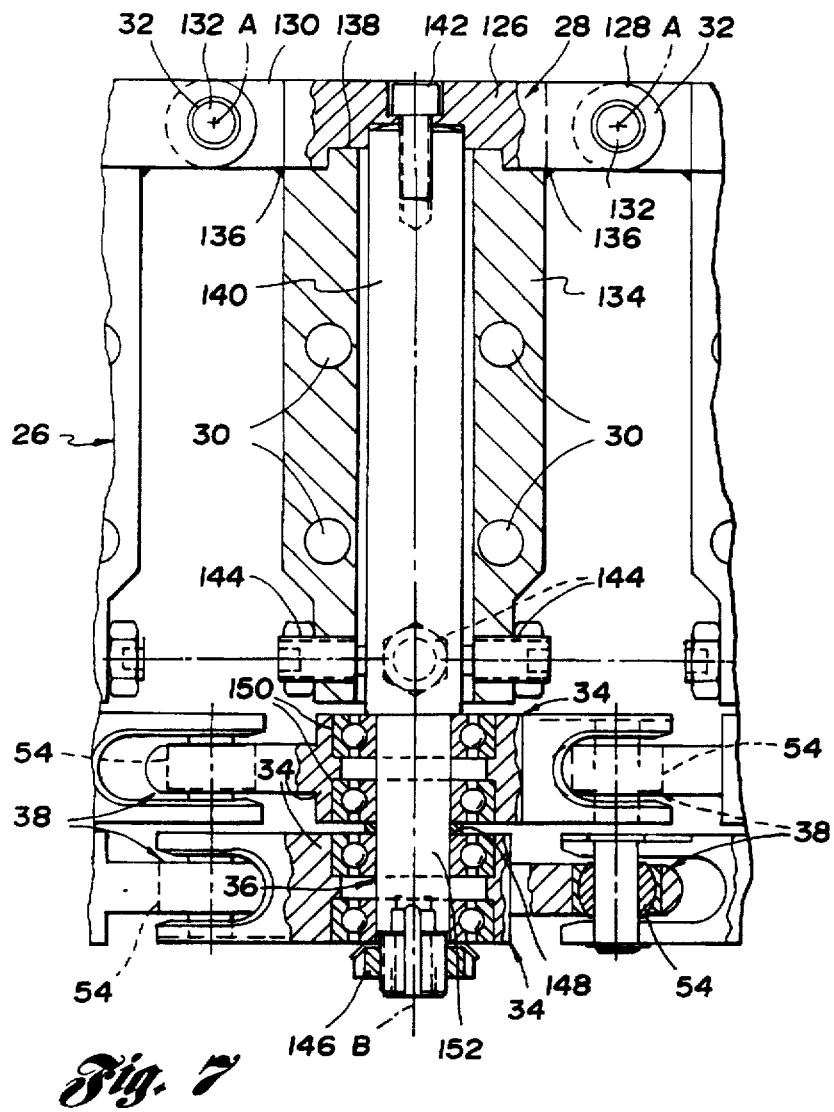
FIG. 7 is a further enlarged view taken partially in section to illustrate the construction of connector links and control links of each linkage.
Figure 8:
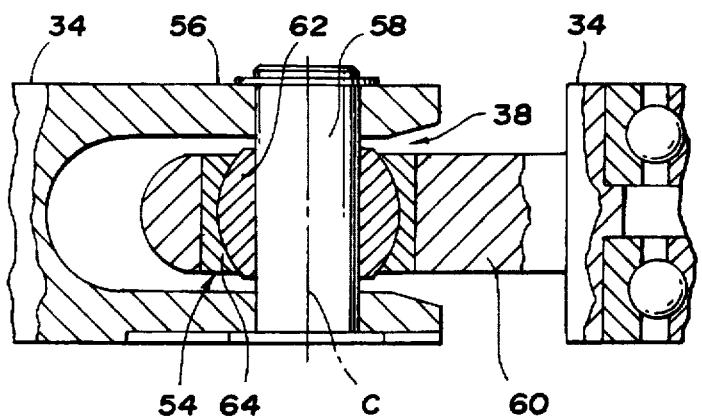
FIG. 8 is a still further enlarged partial view of the linkage illustrating the manner in which the control links thereof are connected to each other by universal connections that are preferably embodied by spherical bearings.

With continuing reference to FIGS. 1–5, apparatus 20, includes a deformable mold 22 having a plurality of mold members 24 that are movable with respect to each other to bend the glass sheet. A linkage 26 illustrated in FIG. 4 extends between the mold members to control movement thereof with respect to each other. The linkage 26 includes connector links 28 that are fixedly connected to the mold members 24 by connections 30 illustrated in FIG. 14. Connector links 28 also have pivotal connections 32 through each other as shown in FIGS. 6, 7 and 10. These pivotal connections 32 have axes A that extend parallel to the glass sheet while flat as in FIG. 2 and throughout the bending thereof such as to the bent shape illustrated in FIG. 3. The linkage 26 also includes control links 34 which, as illustrated in FIGS. 6, 7 and 10 have respective pivotal connections 36 to the connector links 28 in a spaced relationship from the pivotal connections 32. The pivotal connections 36 of the control links 34 to the connector links 28 are about axes B (FIG. 7) that extend perpendicular to the glass sheet while flat as illustrated in FIG. 2 and throughout the bending thereof such as to the bent shape shown in FIG. 3. These control links 34 as best illustrated in FIGS. 7 and 8 have universal connections 38 to each other such that the linkage 26 moves the mold members 24 to bend the glass sheet with a constant radius of curvature. More specifically, with reference to FIG. 7, the pivoting of the connector links 28 to which the mold members are fixed is controlled about their associated pivotal axes A by the pivoting of the control links 34 about their associated pivotal connection axes B to the connector links, and the universal connections 34 permit this pivoting about axes B as well as about associated axes C (FIG. 7 and 8) parallel to axes A.

Figure 14:
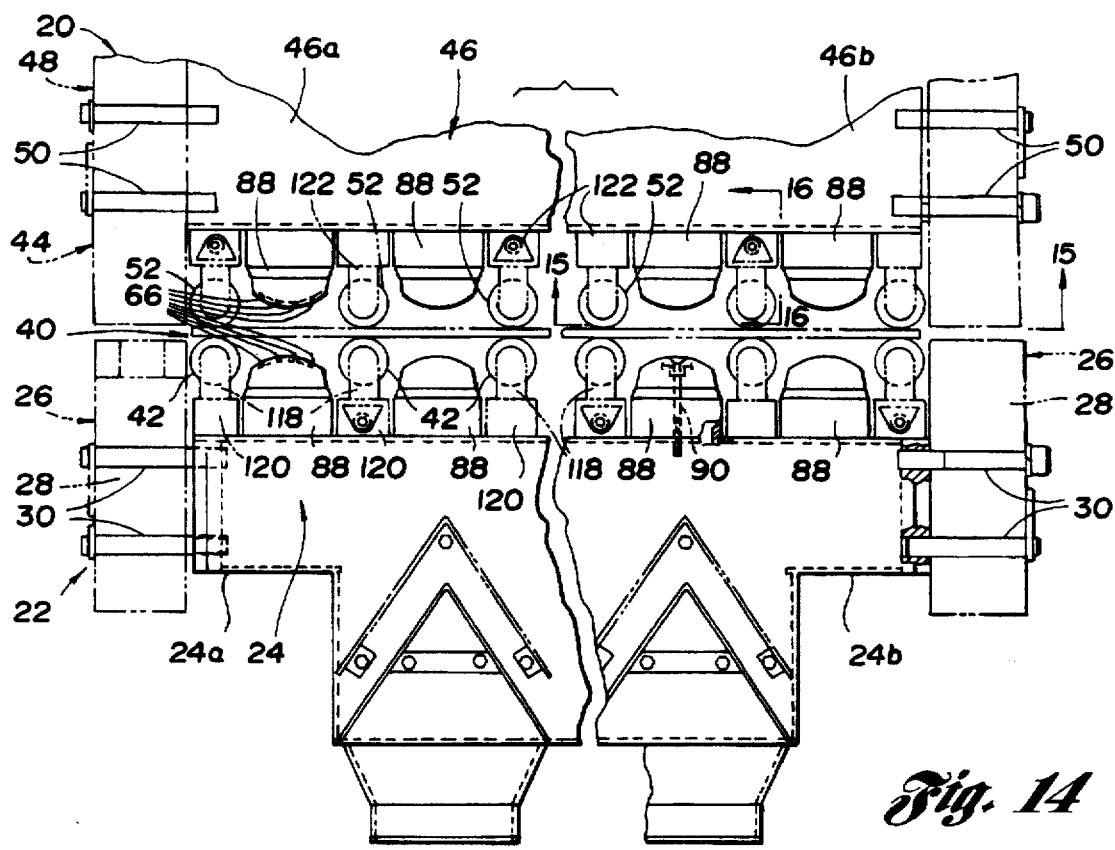
FIG. 14 is a side elevational view taken in the direction of line 14—14 in FIG. 13 to further illustrate the manner in which the glass sheet is supported between the lower and upper deformable molds.

As best illustrated by FIGS. 13 and 14, the deformable mold 22 is embodied by a horizontal conveyor 40 having rotatable conveying elements 42 supported by the mold members 24 to support and convey the glass sheet G for horizontal movement while flat and during the bending.

With further reference to FIGS. 1–5, the apparatus 20 also includes a second deformable mold 44 that cooperates with the first deformable mold 22 in an opposed relationship and has a plurality of mold members 46 that engage the glass sheet and are movable with respect to each other to bend the glass sheet. The second deformable mold 44 includes a linkage 48 that extends between the mold members 46 thereof to control movement thereof with respect to each other with substantially the same construction as the previously described linkage 26. More specifically, the second linkage 48 includes connector links 28 fixedly connected such as by connections 50 shown in FIG. 14 to the mold members 46 thereof and also have pivotal connections 32 to each other about axes A that extend parallel to the glass sheet while flat and during the bending. The second linkage 48 like the first linkage 26 also has control links 34 having pivotal connections 36 to the connector links about axes B that extend perpendicular to the glass sheet while flat as in FIG. 2 and during bending such as to the bent shape shown in FIG. 3. The control links 34 of the second linkage 48 like the first linkage 26 have universal connections 38 to each other. This construction of the second linkage 48 moves the mold members 46 of the second deformable mold 44 in generally the same manner as the first deformable mold and linkage described above to provide bending to the constant radius curved shape in cooperation with the first deformable mold.

As previously described, the first deformable mold 22 is illustrated as being embodied by a horizontal conveyor 40 whose rotatable conveying elements 42 are supported by the mold members 24 thereof to support and convey the glass sheet for horizontal movement while flat and during the bending. The second deformable mold 44 is embodied as an upper deformable mold located above the lower deformable mold that conveys the glass sheet in an opposed relationship. The upper deformable mold has its mold members 46 provided with rotatable elements 52 that engage the glass sheet. Movement of the mold members 46 under the control of linkage 48 in a generally similar manner to the previously described first linkage 26 causes the bending of the glass sheet G to a constant radius curved shape in cooperation with the lower deformable mold.

As illustrated in FIGS. 9 and 10, each of the connector links 28 preferably has a pair of the control links 34 pivotally mounted thereon in an X shape. Such a construction reduces the loading on the pivotal connections 32 between the connector links to thereby provide a more rigid construction. Furthermore, as illustrated in FIGS. 7 and 8, the universal connections 38 between the control links 34 are illustrated as being constructed as spherical bearings 54. More specifically, each control link has a forked end 56 that mounts a pin 58 and also has another end 60 that is received by the forked end 56 of the adjacent control link. Each pin 58 mounts the inner spherical bearing element 62 with respect to the associated control link forked end 56, while each control link end 60 mounts the outer spherical bearing element 64. The engaged spherical surfaces of the inner and outer elements 62 and 64 thus provide the pivoting as previously described. Each connector link 28 thus has a pair of the control links 34 mounted thereon in an X shape with the control links connected to each other by these spherical bearings 54. While other universal type connections could be utilized, the use of spherical bearings in association with the pair of control links 34 in the X shape provides accurate control of the linkage movement with a relatively economical construction that can be readily assembled.

Figure 3:
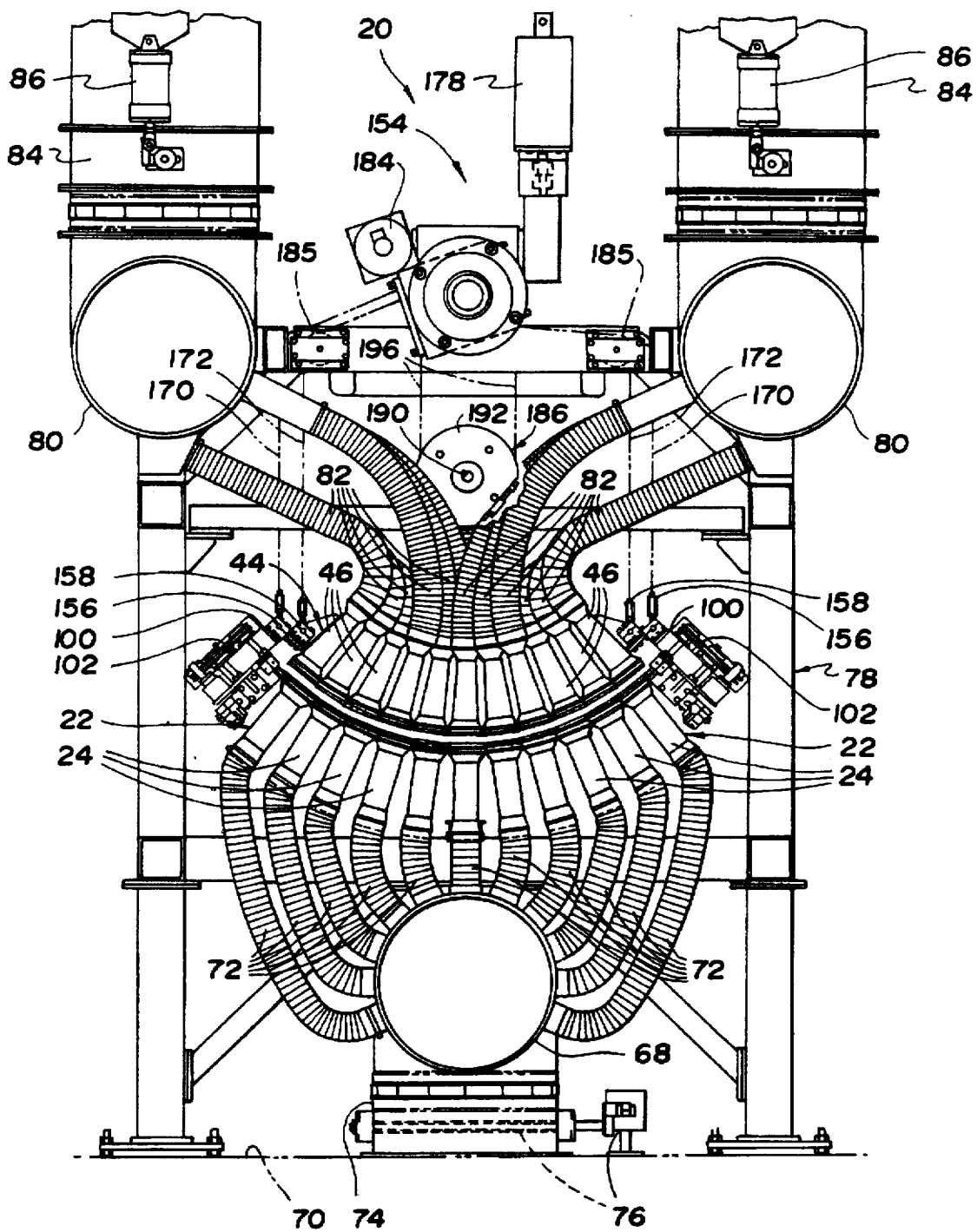
FIG. 3 is an end elevational view similar to FIG. 2 but shown after the deformable molds of the apparatus have been moved to a bent shape.

As the lower and upper deformable molds 22 and 44 move from the flat shape of FIG. 2 to the constant radius bent shape of FIG. 3, the first linkage 26 that controls movement of the lower deformable mold is lengthened while the second linkage 48 that controls movement of the upper deformable mold is shortened. As such, the first linkage 26 is constructed as shown in FIG. 10 so that its control links 34 move inwardly from the X shape to a more straightened shape as the bending proceeds and move outwardly from the more straightened shape to the X shape upon movement back to the flat shape in preparation for the next cycle. On the other hand, the second linkage 48 that controls movement of the upper deformable mold has its control links 34 moved from a more straightened configuration outwardly to a greater X shape as the bending proceeds, and these control links 34 pivot inwardly to a lesser X shape as the second deformable mold is moved back to the flat shape in preparation for the next cycle.

As illustrated by FIGS. 1, 2 and 14, the mold members 24 and 46 of the lower and upper deformable molds 22 and 44 each have an elongated shape including opposite ends 24a,24b and 46a,46b (FIG. 14). The linkages 26 and 48 of the lower and upper deformable molds 22 and 44 have the fixed connections 30 and 50 previously described to adjacent ends 24a and 46a to the respective mold members 24 and 46 at adjacent ends 24a and 46a. The lower and upper deformable molds 22 and 44 each have another linkage 26 and 48 of the same construction as the previously discussed linkages and having fixed connections 30 and 50 to the respective mold members 24 and 46 at the opposite adjacent ends 24b and 46b as the other linkages. Each elongated mold member 24 and 46 is constructed as a quench tube having quench openings 66 (FIG. 15) through which quenching gas is supplied to quench the glass sheet after the bending such as for heat strengthening or tempering. More specifically as illustrated in FIGS. 1, 2 and 3, an elongated quench duct 68 is mounted on the factory floor 70 and has a round cross-section from which flexible quench conduits 72 extend along spaced locations to each of the elongated lower quench tubes 24. Pressurized quench air is supplied through supply ducts 74 to the lower quench duct 68 under the control of associated dampers 76 such that the pressurized quenching gas can be fed through the flexible ducts 72 to the lower side of the bent glass sheet.

With continuing reference to FIGS. 1–3, a framework 78 of the bending and quenching apparatus supports a pair of upper quench ducts 80 that have elongated shapes with round cross-sections like the lower quench duct 68 mounted on the factory floor as described above. Flexible quench conduits 82 connect the upper quench ducts 80 at spaced locations along the length of the apparatus with each of the upper quench tubes 46 of the upper deformable mold 44. Supply ducts 84 controlled by associated dampers 86 supply quenching gas to the upper quench ducts 80 for flow through the flexible quench conduits 82 to the elongated upper quench tubes 46 and eventual flow through the quench openings thereof to quench the upper surface of the bent glass sheet in cooperation with the quenching gas supplied to the lower surface thereof by the quench tubes 24 of the lower deformable mold as described above.

Figure 15:
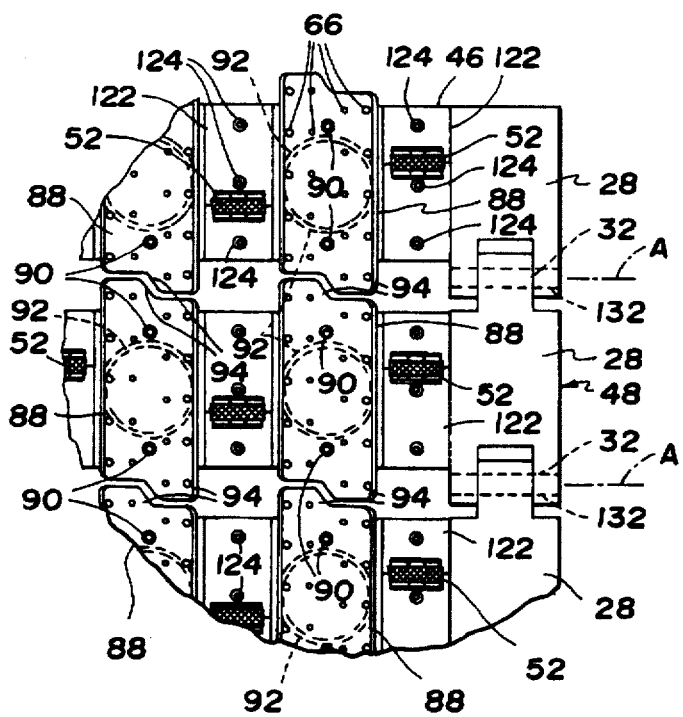
FIG. 15 is a bottom plan view taken along the direction of line 15—15 in FIG. 14 to further illustrate quench plenums of the deformable molds.

As illustrated in FIGS. 14 and 15, each quench tube 24 and 46 includes quench plenums 88 mounted thereon with the rotatable elements 42 and 52 of the respective deformable molds 22 and 44 mounted on the quench tubes between the quench plenums. Each quench plenum 88 has a two-piece cast aluminum construction which is secured by connectors 90 such that a round inlet 92 (FIG. 15) of each quench plenum supplies the quenching gas from the associated quench tube to its quench openings 66. Quench plenums 88 also have ends 94 that interfit with the quench openings 66 positioned and oriented to provide a uniform distribution of the quenching gas that quenches the glass sheet after the bending.

With reference to FIG. 13, the lower deformable mold 22 includes a plurality of deformable drive shafts 96 positioned along its length. These deformable drive shafts 96 support the rotatable conveyor elements 42 of the lower deformable mold 22 and may be constructed of a suitable plastic with a cross-section that provides driving engagement with openings through the conveyor elements 42. Opposite ends of each drive shaft 96 are received by drive journals 98 mounted on a pair of laterally spaced mold mounting members 100 respectively located on the opposite lateral sides of the lower deformable mold. As illustrated by combined reference to FIGS. 4 and 12, each mounting member 100 of the lower deformable mold has a drive mechanism 102 mounted thereon to drive the adjacent ends 104 (FIG. 13) of the deformable drive shafts 96. This driving is performed by an electric motor 106 whose output 108 drives a continuous chain 110 that is received by idler sprockets 112, a tension adjuster socket 114 and drive sprockets 116 connected to the ends 104 of the deformable drive shafts. This driving of the drive shafts 96 is performed as the flat glass sheet is received between the lower and upper deformable molds 22 and 44 as illustrated in FIG. 2 and while being bent to the bent shape of a constant radius such as illustrated in FIG. 3 as well as after the bending during the quenching to provide heat strengthening or tempering as previously described.

It should be noted that the deformable drive shafts 96 as illustrated in FIG. 13 have L-shaped journals 118 whose orientation is preferably switched along the direction of conveyance from one drive shaft to the next so that the conveyor elements 42 engage the glass sheet at different locations in order to prevent strip marking of the glass sheet being bent. These journals 118 are supported by mounts 120 on the lower quench tubes 24 and receive the deformable drive shaft between adjacent conveyor elements 42 with tubular spacers spacing the conveyor elements from each other and from the journals 118. More specifically, the central drive shaft extends through the tubular spacers as well as through the drive openings of the conveyor elements 42 as previously described to provide the driving with the spacers locating the conveyor elements with respect to each other and with respect to the journals 118. Furthermore, it should be noted that each conveyor element 42 as well as the rotatable elements 52 of the upper deformable mold has an outer annular strip of an aromatic polyamide fiber such as Kevlar that engages the glass sheet.

Figure 16:
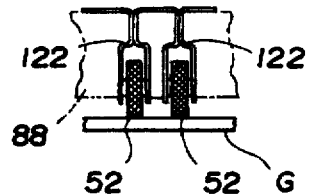
FIG. 16 is taken along the direction of line 16—16 in FIG. 14 through the upper deformable mold and illustrates the positioning of rotatable conveyor elements that engage the glass sheet during the bending.

With combined reference to FIGS. 13, 15 and 16, the rotatable elements 52 of the upper deformable mold are each rotatably mounted by an unsymmetrical journal 122 that is secured to the associated upper quench tube 46 by fasteners 124 with alternate positioning along the direction of conveyance from one rotatable element to the next so that, as with the conveyor elements 42 of the lower deformable mold, there is no strip marking of the heated glass sheet due to engagement only at one location.

The lower and upper linkages 26 and 48 illustrated in FIG. 6 as previously described each has connector links 28 whose construction is best illustrated in FIG. 7. More specifically, each connector link 28 has a connector link member 126 which, as illustrated in FIGS. 9 and 10, has a forked end 128 and another end 130 that is received by the forked ends of the adjacent link member 126 in an interfitted relationship that is secured by a pivot pin 132 of the associated pivotal connection 32. Each connector link 26 also has a link tube 134 that is secured by welds 136 to the link tube 126 with an interfitted engagement 138 that rigidifies the connection. A link shaft 140 of each connector link 28 is received within the link tube 134 and has one end secured to the link member 126 by an axial connector 142 embodied by a threaded bolt. Adjacent the other end of the link tube 134, threaded adjusters 144 which are spaced at 90° intervals locate the link shaft 144 along axis B of the connector link.

With continuing reference to FIG. 7, the control links 34 are mounted on the end of the link shaft 140 opposite the connector 142 and are secured by a threaded lock nut 146 with a bushing 148 spacing the control links from each other. More specifically, each control link 34 has a pair of antifriction bearings 150 whose inner races are mounted by a reduced diameter link shaft portion 152 and whose outer races are secured to the control shaft so that the bearing elements between the races by rolling contact support the control links for their pivoting. More specifically, the spaced relationship of the control links 34 from the pivotal connections 32 of the adjacent connector links 28 and the parallel relationship of the axes A of pivotal connections 32 with respect to the glass sheet as well as the perpendicular relationship of the axes B of control link pivoting provides the constant radius of curvature of the bent glass sheet as previously described. In this connection, it should be noted that the extent to which the control links 34 straighten from their angular relationship shown should be limited to about 10°-15° from a straight line so that binding does not take place upon attempted reverse movement toward the more angular location as previously described in connection with FIGS. 9 and 10.

Figure 4:
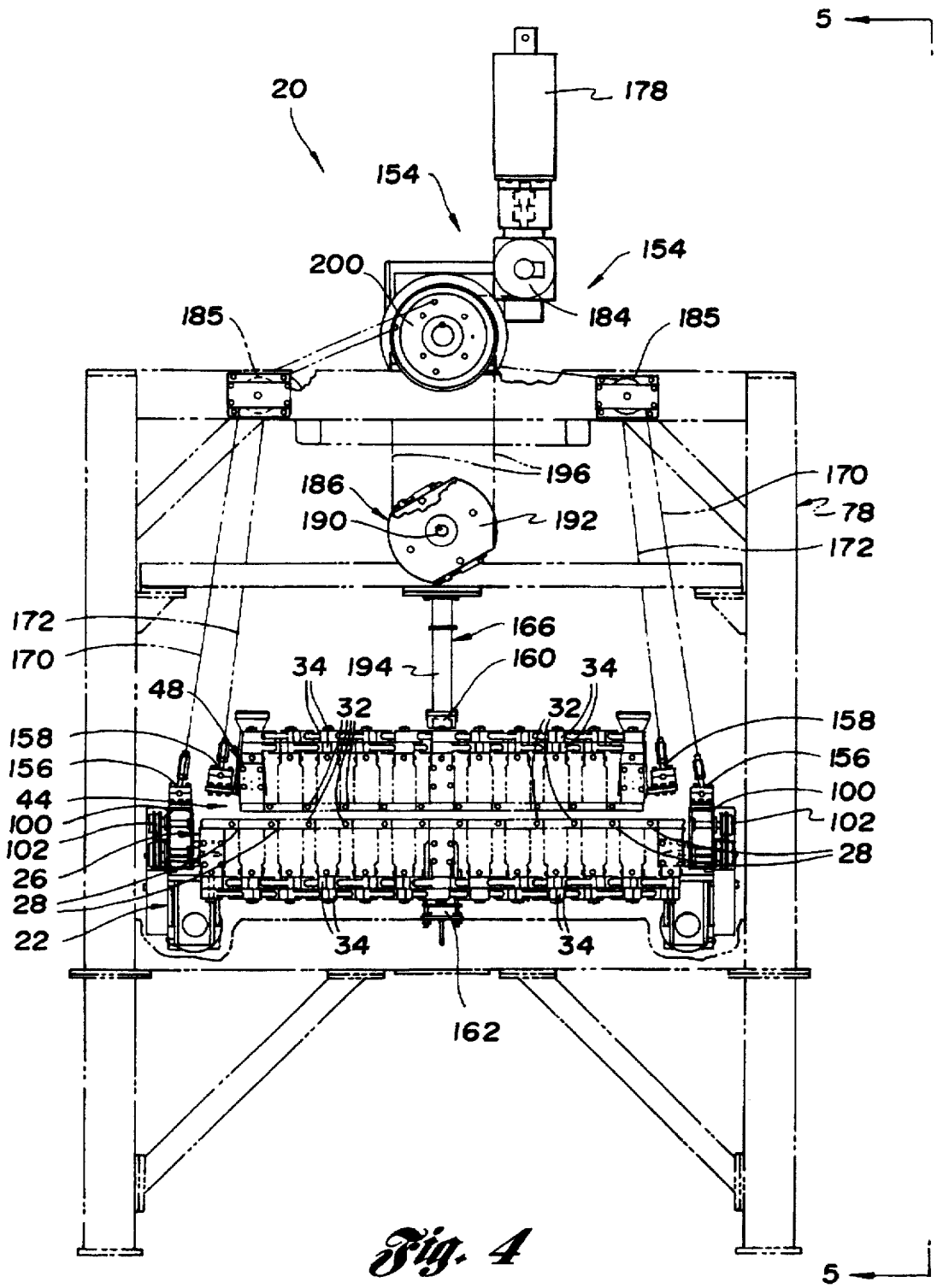
FIG. 4 is an end elevational view taken along the direction of line 4—4 in FIG. 1 and illustrates linkages and an actuating mechanism that cooperatively move the deformable molds between the flat shape and bent shapes of constant radius.
Figure 5:
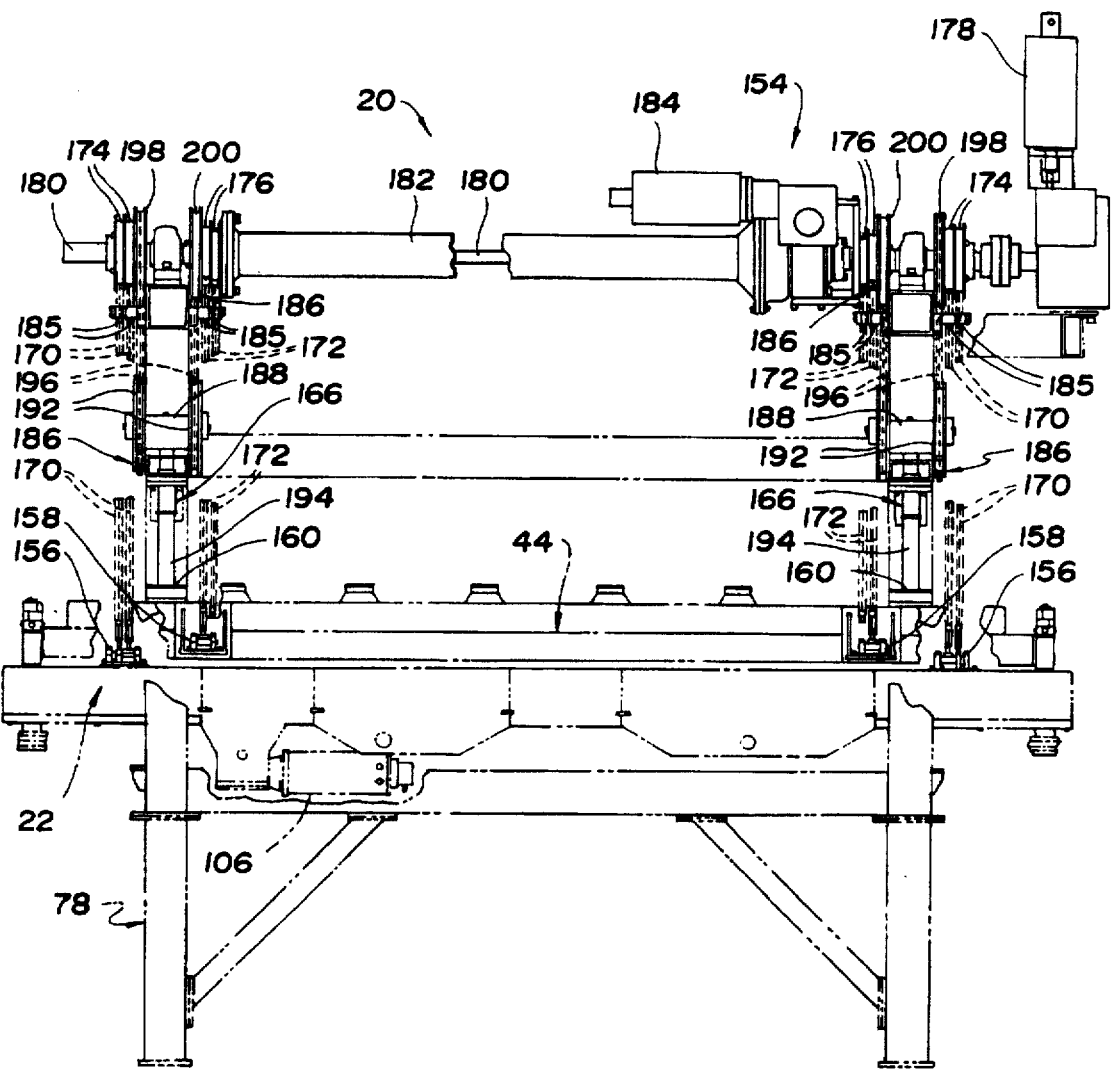
FIG. 5 is a side view taken along the direction of line 5—5 in FIG. 4 to further illustrate the construction of the actuating mechanism and the locations of the linkages that cooperatively move the lower and upper deformable molds between the flat shape and the bent shapes of constant radius.

With reference to FIGS. 4 and 5, the glass sheet bending apparatus 20 includes an actuating mechanism 154 that is mounted on the framework 78 and operable to move the lower and upper linkages 26 and 48 so that the deformable platens move between the flat shape of FIG. 2 and a constant radius bent shape as illustrated in FIG. 3 to perform the bending. More specifically, the actuating mechanism 154 has connections 156, 158 and 160 to the lower and upper linkages 26 and 48 to provide movement thereof to the upwardly concaved shapes such as illustrated in FIG. 3 to move the mold members 24 and 46, i.e. quench tubes, and bend the glass sheet therebetween to an upwardly concave shape of a constant radius as previously described. As shown in FIG. 4, the lower linkage 26 has a fixed center connection 162 to the framework 78. This fixed center connector is provided by a suitable link extender 164 (FIG. 6) from the connector link tube 134 of the central connector link 28, with this extender having portions located on opposite sides of the associated control links 34 so as not to interrupt their pivoting as previously described. Each end of the lower linkage 26 as shown in FIG. 4 also has an associated movable end connection 156 to the actuating mechanism 154. Furthermore, the upper linkage 48 of the upper deformable mold has a center support 166 which includes the connection 160 to the center of the upper linkage 48. More specifically, this center connection 160 is provided as shown in FIG. 6 to the central connector link 28 by a link extender 168 that extends around the associated control links 34 so as not to prevent their pivoting as previously described. The upper linkage 48 of the upper deformable mold also has movable end connections 158 to the actuating mechanism 154 as shown in FIG. 4.

As illustrated in both FIGS. 4 and 5, the actuating mechanism 154 includes flexible members 170 and 172 connected to the movable end connections 156 and 158, respectively, of the lower and upper linkages 26 and 48 of the lower and upper deformable molds. These flexible members are preferably embodied by chains. The actuating mechanism 154 has wheels 174 and 176 that are preferably embodied by sprockets and respectively receive the flexible members 170 and 172 embodied by the chains connected to the movable end connections 156 and 158 of the lower and upper linkages as previously described. A first actuator 178, which is an electric motor, rotates the wheels in opposite directions as is hereinafter described to wind and unwind the flexible members 170 and 172 on their associated wheels 174 and 176 in order to move the deformable molds between the flat and bent shapes. Of course, a greater extent of rotation provides a greater amount of winding and hence bending to a greater extent from the flat shape to a shorter radius of constant curvature.

Figure 11:
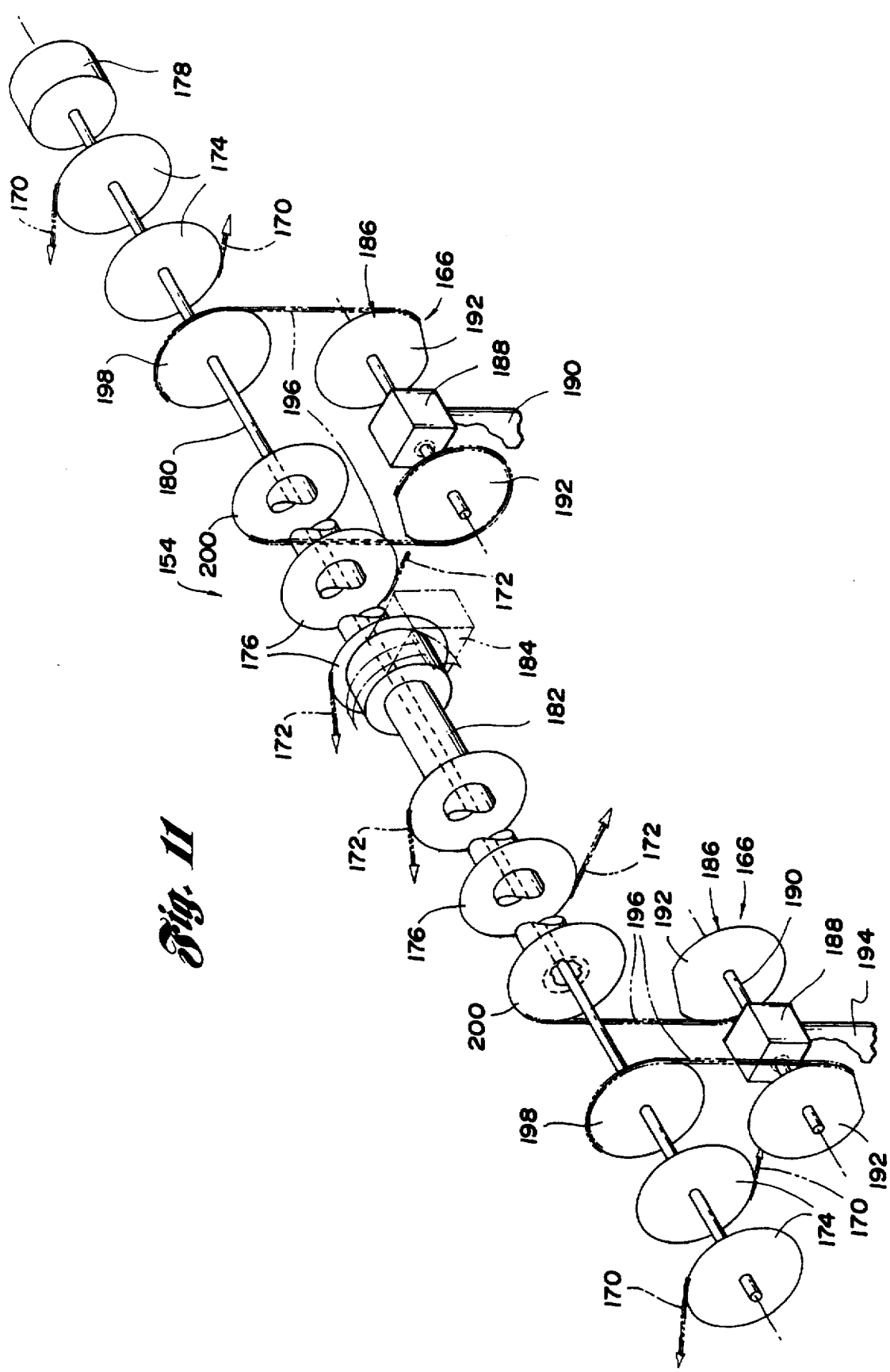
FIG. 11 is a schematic view illustrating an actuating mechanism that moves the linkages to perform the bending.

As illustrated in FIG. 11, the actuating mechanism 154 includes first and second rotary actuator members 180 and 182 one of which is driven by the first actuator 78, specifically the actuator member 180. A second rotary actuator 184 of the actuating mechanism connects the first and second rotary actuator members 180 and 182 and is operable to selectively prevent or provide relative rotation between these actuator members. More specifically, this second rotary actuator 184 like the first one is an electric motor and is mounted on the rotary actuator member 182 with its rotary output rotatively connected such as by belting, gearing or chain driving to the other rotary actuator member 180.

With continuing reference to FIG. 11, the wheels 174 that receive the flexible members 170 connected to the movable end connections of the linkage of the lower deformable mold are fixed on one of the rotary actuator members, which specifically is the one rotary actuator member 180 that is driven by the actuator 178 as previously described. The wheels 176 that receive the flexible members 172 connected to the movable end connections of the linkage of the upper deformable mold are fixed to the other rotary actuator member, which is the rotary actuator member 182 as shown. More specifically, these rotary actuator members 180 and 182 are respectively illustrated as a central shaft and a tube that receives the shaft such that the second rotary actuator 184 provides a connection between the shaft and the tube and is operable to provide the relative rotation therebetween as previously described. It should also be noted as illustrated in FIGS. 4 and 5 that the flexible members 170 and 172 extend over associated idler wheels 185 which are preferably embodied by sprockets rotatably mounted on the framework 78 so that the centrally mounted actuating mechanism 154 can be connected vertically to both ends of both of the linkages 26 and 48 by making angular bends as needed. Furthermore, the linkages 26 and 48 at both ends of each deformable mold 22 and 44 have respective flexible members 170 and 172 as well as associated wheels 174 and 176 so that the linkage at each end of each deformable mold is bent in the same manner as the linkage at the other end. Likewise, there is a center support 166 supporting the center of each upper linkage 48 as is hereinafter more fully described.

As illustrated in FIG. 11, each center support 166 for the upper linkage 48 of the upper deformable mold has a wheel assembly 186 and as shown in FIG. 4 has the previously mentioned connection 160 to the center of the upper linkage 48 that controls the bending of the upper deformable mold. More specifically, the center support 166 includes a journal 188 through which a shaft 190 extends and has a pair of wheels 192 preferably embodied by sprockets mounted on its opposite ends, and a support member 194 depends downwardly from the journal 188 to the connection 160 shown in FIG. 4 to the center of the upper linkage as previously described. The center support 166 as best shown in FIG. 11 also has a pair of flexible members 196 preferably embodied by chains wrapped in opposite directions about the wheel assembly 186. The center support 166 also includes a pair of wheels 198 and 200 preferably embodied by sprockets respectively mounted by the first and second rotary actuator members 180 and 182 which, as previously mentioned, are the shaft and the tube through which the shaft extends. These wheels 198 and 200 respectively receive the flexible members 196 in oppositely wrapped directions to each other.

Operation of only the first actuator 178 as previously described moves the end connections 156 and 158 (FIG. 4) of both linkages to perform the bending of the glass sheet between the lower and upper deformable molds while the center support 166 maintains the center connection 160 of the upper linkage 48 stationary. This stationary support results from the fact that while one wheel 198 or 200 unwinds the associated flexible member 196 as shown in FIG. 11 during operation of the first actuator 178, the other wheel 198 or 200 will then wind the associated flexible member such that even though the wheels 192 may rotate, the shaft 190 remains in the same vertical position such that the support member 194 depending from its journal 188 to the upper linkage center connection 160 shown in FIG. 4 does not move. However, operation of the second rotary actuator 184 provides relative rotation between the first and second rotary actuator members 180 and 182 which moves the end connections 158 and the center connection 160 of the upper linkage 48 shown in FIG. 4 vertically to provide a change in the spacing between the lower and upper deformable molds. More specifically, the adjustment of the end connections takes place due to relative rotation between the rotary members 180 and 182 such that the flexible members 172 adjust the end connections. Furthermore, while the one wheel 198 of the center support 166 remains stationary on the first actuator member 180, the other wheel 200 of the center support 166 is rotated with the net effect being a rotation of the wheel assembly 186 and an effective winding or unwinding that changes the vertical position of the shaft 190 and its journal 188 from which the support member 194 depends to the center connection 160 (FIG. 4) of the upper linkage 48.

It should also be noted that during a bending cycle it is possible to operate both actuators 178 and 184 at the same time. This concurrent operation of actuators 178 and 184 allows a greater spacing between the lower and upper deformable molds 22 and 44 while in the flat shape to facilitate movement of the glass sheet between the molds. Thereafter, the concurrent operation of the actuators moves the upper deformable mold 44 downwardly toward the lower deformable mold 22 as the bending is performed. Of course, the second actuator 184 should terminate operation after the upper deformable mold 44 has moved downwardly toward the lower deformable mold 22 into a spaced relationship approximately equal to the glass sheet thickness. During movement back to the flat shape in preparation for the next cycle, operation of both actuators 178 and 184 moves the upper deformable mold 44 upwardly away from the lower deformable mold 22 into the farther spaced relationship from which the bending begins. This operation allows the opposed deformable molds 22 and 44 to be initially spaced from each other a greater thickness than the thickness of the glass sheet and to thereafter simultaneously bend the deformable molds and move the molds toward each other such that both molds engage the glass sheet to provide its bending. The deformable molds may then provide the quenching gas as previously described to quench the bent glass sheet. Furthermore, the deformable mold 22 is located below the deformable mold 44 in a lower and upper arrangement with the lower deformable mold 22 functioning as a conveyor as previously described, and the molds are bent to upwardly concave shapes as they are simultaneously moved toward each other with the upper deformable mold 44 being moved downwardly to provide the movement of the molds toward each other. Also, it should be appreciated that this mold movement toward each other at the ends of the linkages is a relative movement in that the upper linkage ends move upwardly slower than the lower linkage ends as the bending is performed with both rotary actuators 178 and 184 operating the actuating mechanism as described above.

As previously mentioned, it is possible for the lower and upper deformable molds 22 and 44 to receive a prebent glass sheet rather than a flat glass sheet such that the bending proceeds from a partially bent shape to a further bent shape, after which quenching can be performed as previously described.

While the best mode for carrying out the invention has been described in detail, those familiar with the art to which this invention relates will recognize various alternative designs and embodiments for practicing the invention as defined by the following claims.

What is claimed is:

1. Glass sheet bending apparatus comprising: lower and upper deformable molds that oppose each other and receive a heated glass sheet to be bent; each deformable mold including a plurality of mold members that are engageable with the glass sheet and are movable with respect to each other to bend the glass sheet; lower and upper linkages that respectively extend between the mold members of the lower and upper deformable molds to control movement thereof with respect to each other; an actuating mechanism that moves the linkages of the lower and upper deformable molds to bend the glass sheet; the linkage of the lower deformable mold having a fixed center connection and also having movable end connections; the linkage of the upper deformable mold having a center support and also having movable end connections; the actuating mechanism including flexible members connected to the movable end connections of the linkages of the lower and upper deformable molds; the actuating mechanism having wheels that receive the flexible members; the actuating mechanism including first and second rotary actuator members; a first actuator that rotatively drives the first rotary actuator member; a second rotary actuator that connects the first and second rotary actuator members and is operable to selectively prevent or provide relative rotation therebetween; the wheels that receive the flexible members connected to the movable end connections of the linkage of the lower deformable mold being fixed on one of the rotary actuator members; the wheels that receive the flexible members connected to the movable end connections of the linkage of the upper deformable member being fixed to the other rotary actuator member; the center support for the linkage of the upper deformable mold having a wheel assembly including a connection thereto and having a pair of flexible members wrapped in opposite directions about the wheel assembly; and the center support for the linkage of the upper deformable mold also having a pair of wheels respectively mounted by the first and second rotary actuator members and respectively receiving the flexible members of the wheel assembly in oppositely wrapped directions such that operation of the first actuator rotates the wheels to move the flexible members and to move the end connections of both linkages to perform the bending of the glass sheet between the lower and upper deformable molds, while operation of the second actuator rotates the wheels to move the flexible members to move both end connections and the center support connection of the linkage of the upper deformable mold to provide movement that changes the spacing between the lower and upper deformable molds.

2. Glass sheet bending apparatus as in claim 1 further comprising: the flexible members being chains and the wheels being sprockets that receive the chains.

3. Glass sheet bending apparatus as in claim 1 further comprising: the first and second actuators being electric motors.

4. Glass sheet bending apparatus as in claim 1 further comprising: one of the rotary actuator members being a shaft, the other rotary actuator member being a tube that receives the shaft, and the second rotary actuator selectively providing a connection between the shaft and the tube or permitting relative rotation therebetween.

5. Glass sheet bending apparatus as in claim 1 further including a framework, and also including idler wheels that are mounted on the framework and that receive the flexible members connected to the movable end connections of the linkages of the lower and upper deformable molds.

6. Glass sheet bending apparatus as in claim 1 further comprising: the mold members of the lower and upper deformable molds each having an elongated shape and being quench tubes having quench openings through which quenching gas is supplied to quench the glass sheet after the bending.

7. Glass sheet bending apparatus as in claim 6 wherein each quench tube includes quench plenums mounted thereon, each deformable mold having rotatable elements mounted between the quench plenums, and the quench plenums defining the quench openings through which the quenching gas is supplied to quench the bent glass sheet.

8. Glass sheet bending apparatus as in claim 7 wherein the quench plenums have opposite ends that interfit with the quench plenums mounted on the adjacent quench tubes of the respective deformable mold and having quench openings positioned and oriented to provide a uniform distribution of the quenching gas that quenches the glass sheet.

9. Glass sheet bending apparatus comprising: lower and upper deformable molds that oppose each other and receive a heated glass sheet to be bent; each deformable mold including a plurality of mold members that are engageable with the glass sheet and are movable with respect to each other to bend the glass sheet; lower and upper linkages that respectively extend between the mold members of the lower and upper deformable molds to control movement thereof with respect to each other; an actuating mechanism that moves the linkages of the lower and upper deformable molds to bend the glass sheet; the linkage of the lower deformable mold having a fixed center connection and also having movable end connections; the linkage of the upper deformable mold having a center support and also having movable end connections; the actuating mechanism including chains connected to the movable end connections of the linkages of the lower and upper deformable molds; the actuating mechanism having sprockets that receive the chains; the actuating mechanism including first and second rotary actuator members one of which is a shaft and the other of which is a tube that receives the shaft; a first electric motor actuator that rotatively drives the first rotary actuator member; a second electric rotary actuator that connects the first and second rotary actuator members and is operable to selectively prevent or provide relative rotation therebetween; the sprockets that receive the chains connected to the movable end connections of the linkage of the lower deformable mold being fixed on one of the rotary actuator members; the sprockets that receive the chains connected to the movable end connections of the linkage of the upper deformable member being fixed to the other rotary actuator member; the center support for the linkage of the upper deformable mold having a wheel assembly including a connection thereto and including sprockets and a pair of chains wrapped in opposite directions about its sprockets; and the center support for the linkage of the upper deformable mold also having a pair of sprockets respectively mounted by the first and second rotary actuator members and respectively receiving the chains of the wheel assembly in oppositely wrapped directions such that operation of the first actuator rotates the sprockets to move the chains and to move the end connections of both linkages to perform the bending of the glass sheet between the lower and upper deformable molds, while operation of the second actuator rotates the sprockets to move the chains to move both end connections and the center support connection of the linkage of the upper deformable mold to provide movement that changes the spacing between the lower and upper deformable molds.

10. Glass sheet bending apparatus comprising: lower and upper deformable molds that oppose each other and receive a heated glass sheet to be bent; each deformable mold including a plurality of mold members that have elongated shapes embodying quench tubes; each quench tube including quench plenums mounted thereon and having quench openings; each deformable mold including rotatable elements mounted on the quench tubes between the quench plenums; the rotatable elements being engageable with the glass sheet and the mold members being movable with respect to each other to bend the glass sheet; lower and upper linkages that respectively extend between the mold members of the lower and upper deformable molds to control movement thereof with respect to each other; an actuating mechanism that moves the linkages of the lower and upper deformable molds to bend the glass sheet; the linkage of the lower deformable mold having a fixed center connection and also has movable end connections; the linkage of the upper deformable mold having a center support and also having movable end connections; the actuating mechanism including chains connected to the movable end connections of the linkages of the lower and upper deformable molds; the actuating mechanism having sprockets that receive the chains; the actuating mechanism including first and second rotary actuator members one of which is a shaft and the other of which is a tube that receives the shaft; a first electric motor actuator that rotatively drives the first rotary actuator member; a second electric rotary actuator that connects the first and second rotary actuator members and is operable to selectively prevent or provide relative rotation therebetween; the sprockets that receive the chains connected to the movable end connections of the linkage of the lower deformable mold being fixed on one of the rotary actuator members; the sprockets that receive the chains connected to the movable end connections of the linkage of the upper deformable member being fixed to the other rotary actuator member; the center support for the linkage of the upper deformable mold having a wheel assembly including a connection thereto and including sprockets and a pair of chains wrapped in opposite directions about its sprockets; and the center support for the linkage of the upper deformable mold also having a pair of sprockets respectively mounted by the first and second rotary actuator members and respectively receiving the chains of the wheel assembly in oppositely wrapped directions such that operation of the first actuator rotates the sprockets to move the chains and to move the end connections of both linkages to perform the bending of the glass sheet between the lower and upper deformable molds, while operation of the second actuator rotates the sprockets to move the chains to move both end connections and the center support connection of the linkage of the upper deformable mold to provide movement that changes the spacing between the lower and upper deformable molds.

* * * * *